Sept. 22, 1964  H. W. HALLESY  3,149,860
HIGH PRESSURE, HIGH TEMPERATURE RECONNECTIBLE TUBE FITTING
Filed Jan. 16, 1961  2 Sheets-Sheet 2

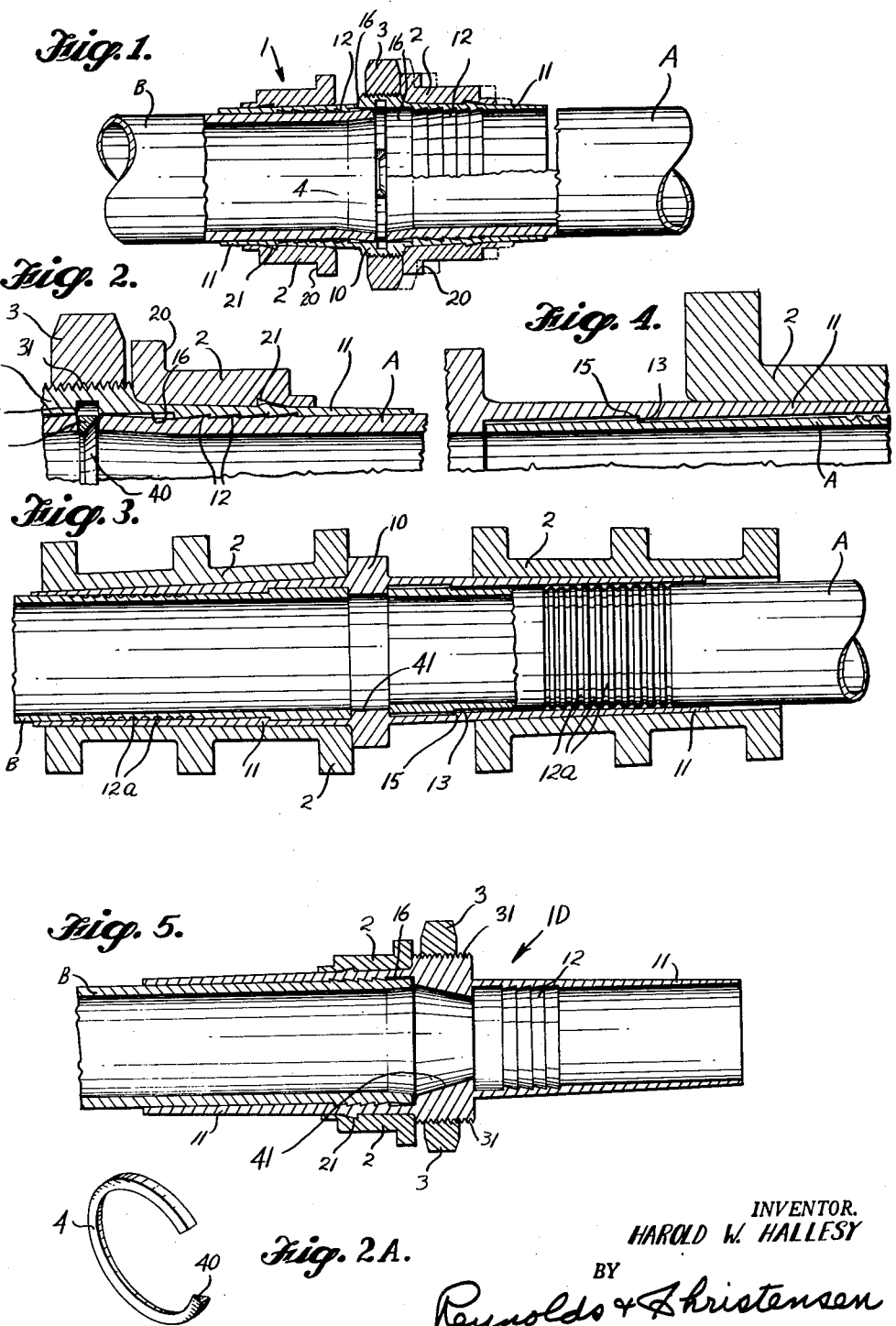

INVENTOR.
HAROLD W. HALLESY
BY
Reynolds + Christensen
ATTORNEYS

United States Patent Office 3,149,860
Patented Sept. 22, 1964

3,149,860
HIGH PRESSURE, HIGH TEMPERATURE
RECONNECTIBLE TUBE FITTING
Harold W. Hallesy, Seattle, Wash., assignor to Boeing Airplane Company, Seattle, Wash., a corporation of Delaware
Filed Jan. 16, 1961, Ser. No. 82,871
3 Claims. (Cl. 285—18)

This invention concerns a fitting whereby a tube end which is highly resistant to deformation, such as one of stainless steel, can be connected to another tube end of like characteristics, or to a similar terminal, in a leakproof manner, without elastomeric seals and without the use of dissimilar or soft metal seals, whereby the coupling remains tight throughout any range of temperature or pressure to which it may be subjected in use. Moreover, while the connection is not intended to be disconnected and reconnected often, nevertheless it can be disconnected ad reconnected, hence is not of the permanent type characterized by brazed joints.

By reason of the use of like metal throughout the fitting of this invention there is no problem of leakage arising from different coefficients of expansion in adjoining parts of the fitting, nor of yieldability of the metal of one part under pressure that other parts will resist. By reason of the elimination of elastomeric seals the fitting can endure temperatures above any which elastomeric seals can endure, and will still remain tight.

As to brazed connections, these are often difficult to complete satisfactorily when the point of installation is not easily accessible, and the heating accompanying the brazing is likely to reduce the strength of the fitting parts. Inspection of installed brazed fittings is difficult or impossible. The fitting of this invention requires no heat to seal it, but coupling is accomplished simply and reliably, with a metal-to-metal seal, even in places difficult of access, and no inspection is required except to see that parts abut their stops.

Additionally, in contrast to fittings which require flared or otherwise deformed tube ends—which are very difficut to deform when using tough tubes of stainless steel or the like capable of withstanding high pressures and temperatures—no deformation of tube ends is required by this invention. This avoids the labor and expense of flaring or the like, and the weakening entailed thereby, and insures that a tight connection can be made at all times, even under field conditions.

Overtorquing of prior threaded fittings at installation can ruin the fittings, whereas the fitting of this invention can be installed to a positive stop on the fitting by a tool having a controlled squeeze, eliminating this possible source of damage.

Prior fittings have been subject to damage or loosening from vibration. The fitting of this invention is not subject to the same in nearly the degree as the prior fittings, in that it is of lighter weight, has longer tube end supports, and no threads as part of the securing means, to vibrate loose.

The fitting of this invention, in a preferred form, requires no machining of the tube end, but the fitting closely receives the tube end, and is crowded so tightly radially upon the tube end as to produce actual deformation, possibly into the plastic range. This insures the integrity of the seal, and any increase in internal pressure only serves to increase its integrity.

Also, the fitting is arranged with an internal diameter throughout nearly if not quite matching the internal diameter of the tube, thereby producing a minimum pressure drop across the fitting.

These and other objects, and the structures whereby they are attained, will appear more fully hereinafter, and will be illustrated by the representative forms shown in the drawings and described herein. The novel features of the invention are set forth in the claims.

FIGURE 1 is an axial sectional view of a coupling between tube ends, according to this invention.

FIGURE 2 is an enlarged detail, in axial section, similar to FIGURE 1.

FIGURE 2A is an isometric view of a spring stop ring such as is incorporated in the structure of FIGURES 1 and 2.

FIGURE 3 is an axial sectional view of a modified form of such a coupling, and FIGURE 4 is an enlarged detail of the same, similar to FIGURE 2.

FIGURE 5 is an axial section of a reducer fitting made in accordance with this invention, with a tube connected at the larger end thereof.

Figure 6:
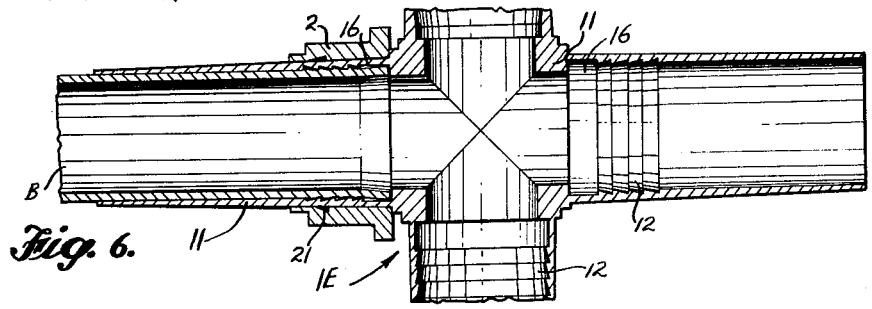
FIGURE 6 is an axial sectional view of a cross which incorporates the invention.

The invention is illustrated in FIGURES 1 and 2 as employed in a coupling joining the closely adjacent ends of two aligned tubes A and B of like diameters, which may be assumed to be of material which is difficult to form, flare, or otherwise work, such as stainless steel, and intended to contain a fluid at high temperature and high pressure. The coupling in such circumstances would include a central fitting 1 of like material including a ring 10 and two integral, oppositely directed sleeves 11 of somewhat lesser diameter than the ring 10, but of quite appreciable length. Initially each sleeve would be of an internal diameter just enough larger than the outside diameter of its tube—A for example—that the tube end will slip inside and be received within the sleeve 11. The sleeve is externally tapered from a larger circumference nearer the ring 10 to a smaller circumference at its outer end, as FIGURE 2 best shows. The taper need be only slight, say 2°. One of the closely adjoining surfaces of the tube A and sleeve 11 is circumferentially grooved with a plurality of axially spaced grooves; preferably it is the inside of the sleeve which has the grooves 12, and they have sharp edges and shoulders facing in a manner to resist pulling out of the tube from the sleeve, after constriction of the sleeve onto the tube. Inside of the innermost shoulder the bore of sleeve 1 should be relieved, at 16, for a purpose that will shortly be made clear.

Constriction of the sleeve is accomplished by an annular slide 2, the bore whereof is tapered complementally to the taper of the sleeve's outer surface, and which fits the sleeve sufficiently tightly that when crowded axially onto the sleeve the latter is constricted onto and deforms the tube A. The crowding can be accomplished by a hydraulic squeezing device or the like, reacting between shoulders 20 of the opposite slides. Each slide is of material axial length, and in particular constricts its sleeve throughout the region of its grooves 12. The ring 10 constitutes a limit stop for the slides, there being an annulus left around the ring between the slides. Constriction, whether elastic or plastic, will deform metal from the tube end A into the grooves 12 of the sleeve, and so produce a tight labyrinthine seal. The inner end of the tube, at the relieved portion 16 of the sleeve, is not subject to the same stress, and the tube end flares, to afford a further and even more positive lock. Since tube and sleeve are both of similar metal, having the same coefficient of thermal expansion, the integrity of the seal is not affected by thermal changes.

While the sleeve 11 will receive its tube end when both are relaxed, and the constriction of the sleeve is preferably elastic, it may proceed beyond its yield point, into the plastic range. In the latter case the tube end, at first resisting plastic deformation, will eventually yield also, and deform. Metal of the tube will bulge into the grooves 12, behind their sharp edges, and metal of the tube end will flare into annular groove 16. Now, so long as the slide 2 remains in place, the tube end can not be pulled from the sleeve, for the tough metal flowed into the grooves and the flared end will strongly resist this. The slightness of the taper of the engaged surfaces of the slide and sleeve should ordinarily retain the slide in place, but if desired the slide may be formed at its interior surface with a sharp-edged groove 21, facing in the direction to resist its backing off when metal from the sleeve 11 is deformed thereinto by the constriction; see FIGURE 2.

Figure 7:
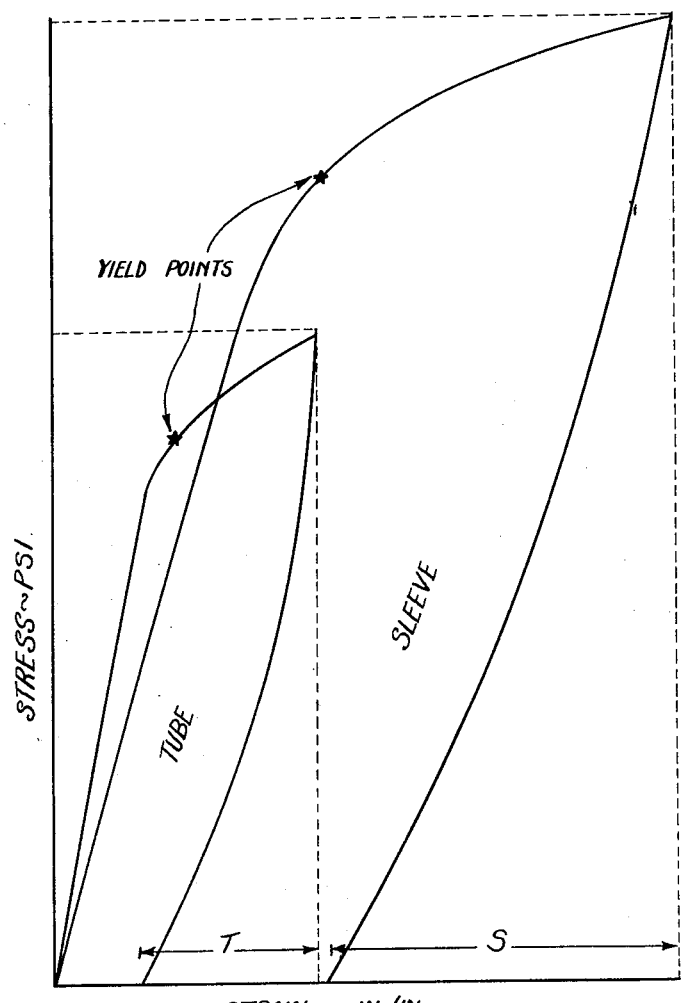
FIGURE 7 is a stress-strain graph, illustrating how the elastic recovery of parts, even after plastic yielding, enables the parts to be disconnected if need be.

If it is necessary to disconnect the coupling, a back-off nut 3 may be provided to accomplish this. This nut 3 is threaded onto the ring 10 in the annulus about it, and through the threads at 31 it may be urged so strongly against the slides 2, one at a time, as to force the slide away from the ring 10, allowing the sleeve and tube to relax. If deformation was wholly within the elastic range, relaxation allows parts to resume their initial form. As FIGURE 7 shows, if deformation was in the plastic range, the sleeve, which by design was harder and was stressed farther into the plastic range than was the tube, will relax through a greater distance S than the relaxation T of the tube, although the tube will not relax to its original size, having passed its yield point. This still insures clearance between and disconnection readily of the tube end A from its sleeve 11, usually without removal of deformed material within grooves 12 by the latters' sharp edges, nor of any remainder of its flared end. After merely elastic deformation, but even after plastic deformation, upon reconnection the joint will be substantially as tight as before, for the sleeve's grooves 12 are located by means about to be described in registry with the material squeezed into them from the tube end.

While the tube ends A and B are assumed to be but slightly spaced, there should be some space between them. Assuming that they are to be coupled for the first time, the sleeve 11 at the right is slipped onto the tube end A (the slide 2 at both ends being withdrawn to the outer ends of the sleeves). It is, however, necessary to slip the left sleeve end past tube end B, so the fitting is slid farther to the right. A split spring ring 4, which is received within a circumferential locator groove 14 interiorly of the ring 10, and which eventually serves as a spacer and stop between tube ends A and B, is beveled at one edge at least, at 40, is enabled to expand by camming action of the tube end A on the bevel, and slips onto tube end A. Now the entire fitting 1 can be slid to the right, onto A, far enough to swing its left end past the end of tube B. The left sleeve 11 now slides onto tube end B, until the ring 4 snaps past the end of tube A and contracts within its groove 14. Now it positively spaces tube end B from tube end A, and the operator knows that the fitting is properly positioned relative to each tube end. The slides 2 are now drawn inwardly until each abuts the ring 10, constricting the sleeves and tube ends and deforming them as described above.

Instead of forming grooves 12 within the bore of sleeve 11, grooves 12a (see FIGURES 3 and 4) may be cut in the exterior of the tube end; their edges should be sharp, to bite into the metal of the sleeve when the latter is constricted. If the tube end is machined to cut the grooves 12a it may be preferred at the same time to taper the exterior of the tube sufficiently to leave a shoulder 13 facing outwardly on the tube end, positioned to engage behind a shoulder 15 interiorly of the sleeve 11 when the latter is constricted, and thus to lock the tube end positively against pulling out from the sleeve, in addition to the deformation of sleeve material into the grooves 12a.

Further, and although there is no necessary relation between the location of the grooves on the tube and the stop ring, in this form the fitting is shown as provided with a fixed stop ring 41 projecting inwardly from and integral with the ring 10. This assumes that each pipe end can be pushed into its sleeve, to stop against the stop ring 41. This practically eliminates any break in the smoothness of the bore across the joint, and lessens turbulence and pressure drop. The form which uses the split ring 4 is, however, nearly as smooth and free from excessive pressure drop.

It has been stated that the sleeve and the tubes should be of like material, so that they have like coefficients of expansion, and will not separate nor allow leakage because of differential thermal expansion or contraction. The same holds true of the slide 2, for if it is of material like the sleeve whereon it crowds, there is no thermal difference which is likely to loosen the slide.

The invention is shown in FIGURE 5 as embodied in a reducer fitting 1D. This fitting has a fixed stop ring 41, but otherwise is similar to the fitting of FIGURES 1 and 2. Similar principles may be incorporated in elbows, T's, crosses, and at spigot connections of various sorts. A cross fitting 1E is shown as representative of these various styles, in FIGURE 6.

The fitting is lighter than a normal union or coupling, and is extremely unlikely to come loose during use, nor to leak either from thermal or pressure effects, yet can be loosened, removed, and replaced. Higher internal pressure presses the tube ends even more tightly against the sleeves wherein they are received, and prevents leakage. Fatigue failure is guarded against by the lighter weight and longer bearings on the tube ends than in conventional couplings. No reliance for tightness is placed upon threaded connections, which can loosen under vibration, and which present the problem of correct torquing at installation. The strength-to-weight ratio is superior in this fitting to presently known fittings.

I claim as my invention:

1. A reconnectible tube fitting comprising a pair of tubes, a sleeve, and a pair of annular slides all constructed of like material; the end portions of the sleeve being engaged over end portions of the tubes such that the opposing inner and outer peripheral surfaces thereof, respectively, are in faying contact with one another, the central portion of the sleeve having limit stop means therewithin interposed between and abutting the tube ends so as to position the tubes in the sleeve; and the slides, in turn, being engaged over the sleeve end portions such that the opposing inner and outer peripheral surfaces thereof, respectively, are in faying contact with one another and the slides are spaced apart by an annulus around the outer peripheral surface of the sleeve central portion; such faying surfaces of the slides and the sleeve end portions being initially complementally tapered slightly inwardly in the directions relatively axially away from the sleeve central portion, but mutually sized diametrically so that as the slides are engaged over the sleeve end portions in directions relatively axially toward the sleeve central portion, the faying surfaces of the sleeve and tube end portions are deformed relatively radially inwardly of the tubes to bond the sleeve and the tubes together; there being axially spaced circumferential grooves in at least one of the faying surfaces of the sleeve and tube end portions so that as deformation occurs, a portion of the other of the latter faying surfaces is crowded into the grooves to seal the sleeve with each of the tubes; and there also being a back-off nut threaded on the outer peripheral surface of the sleeve central portion and disposed in the annulus between the slides, which nut is operative by turning movement in alternative directions relatively axially toward the slides to press the latter individually off the sleeve by reaction from the threads.

2. A reconnectible tube fitting according to claim 1 wherein the inner peripheral surface of the sleeve central portion has a circumferential locator groove therein and the limit stop means includes a resilient ring which is initially expanded and received in the locator groove, but which is operative on relaxing in the fitting to assume a position intermediate the ends of the tubes.

3. A reconnectible tube fitting according to claim 1 wherein the inner peripheral surface of the sleeve central portion has a circumferential locator flange projecting inwardly thereof to form the limit stop means.

References Cited in the file of this patent

UNITED STATES PATENTS

| | | |
|---|---|---|
| 746,440 | Austin | Dec. 8, 1903 |
| 1,186,812 | McFerran | June 13, 1916 |
| 1,186,813 | McFerran | June 13, 1916 |
| 1,778,244 | Cadden | Oct. 14, 1930 |
| 1,834,190 | Timbs | Dec. 1, 1931 |
| 2,011,433 | Blagg et al. | Aug. 13, 1935 |
| 2,185,725 | Elliot | Jan. 2, 1940 |
| 2,310,536 | Melsom | Feb. 9, 1943 |
| 2,396,163 | Dies | Mar. 5, 1946 |
| 2,507,261 | Mercier | May 9, 1950 |
| 2,613,959 | Richardson | Oct. 14, 1952 |
| 2,640,716 | Bigelow | June 2, 1953 |
| 2,772,100 | Kreissig | Nov. 27, 1956 |

FOREIGN PATENTS

| | | |
|---|---|---|
| 15,358 | Great Britain | Nov. 21, 1884 |
| 164,285 | Switzerland | Dec. 1, 1933 |